June 24, 1947. R. L. HIBBARD 2,422,964
LATHE
Filed Feb. 3, 1943 3 Sheets-Sheet 1

INVENTOR.
Robert L. Hibbard,
BY Edward A. Lawrence
his attorney

June 24, 1947.  R. L. HIBBARD  2,422,964

LATHE

Filed Feb. 3, 1943   3 Sheets-Sheet 2

INVENTOR.
Robert L. Hibbard.
BY Edward A. Lawrence
his attorney.

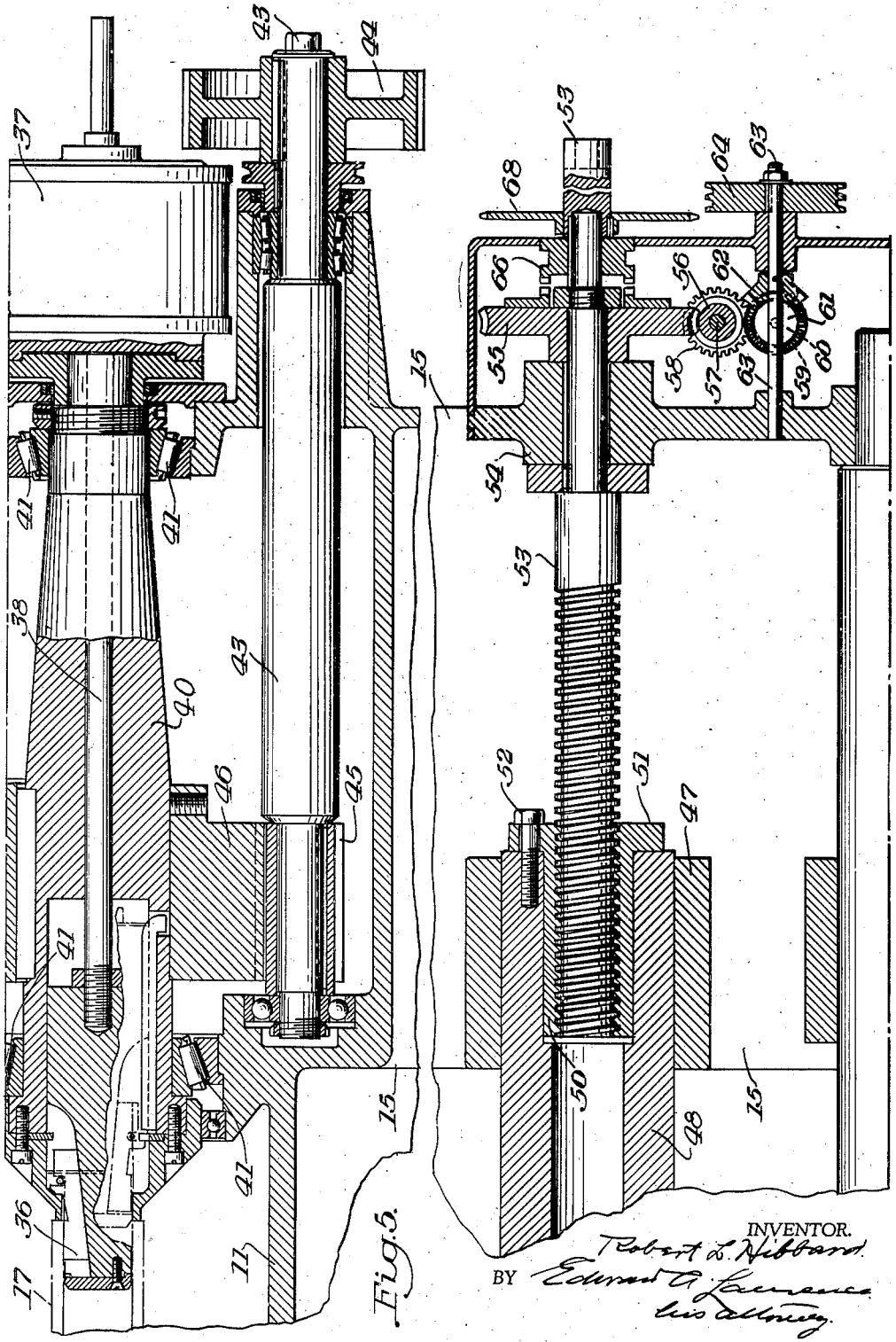

Patented June 24, 1947

2,422,964

UNITED STATES PATENT OFFICE 2,422,964
LATHE

Robert L. Hibbard, Bellevue, Pa., assignor of one-half to William K. Stamets, Mars, Pa.; Stewart C. Hibbard, Robert L. Hibbard, Jr., and Hays M. Junkin, executors of said Robert L. Hibbard, deceased Application February 3, 1943, Serial No. 474,506

9 Claims. (Cl. 82—14)

This invention relates generally to turning and more particularly to the method and apparatus for turning work pieces such as projectiles which are of circular cross section and of varying axial section wherein a plurality of tools independently controlled by cams simultaneously cut different sections of the work piece and thus shorten the time required to accurately reproduce the work pieces of the same shape.

The principal object of this invention is the provision of a method and apparatus for accurately turning shell cases of circular cross section and of varying axial section by a plurality of independent cam actuated cutting tools.

Another object is the provision of a method and apparatus for controlling the resultant cutting forces in a multiple tool lathe.

Another object is the provision of a lathe having three operating axes all of which are supported in a pair of spaced plates or housings.

Another object is the provision of a tool carriage movable longitudinally of a lathe and arranged to carry rocking tool supports independently oscillatable on the carriage.

Another object is the provision of an elevator for receiving and elevating the shell case into position where it may be chucked in the lathe.

Other objects and advantages appear in the following description and claims.

In the accompanying drawings a practical embodiment illustrating the principles of this invention are shown wherein:

Fig. 5 is an enlarged sectional view showing the spindle and tool carriage drive mechanism.

Figure 1:
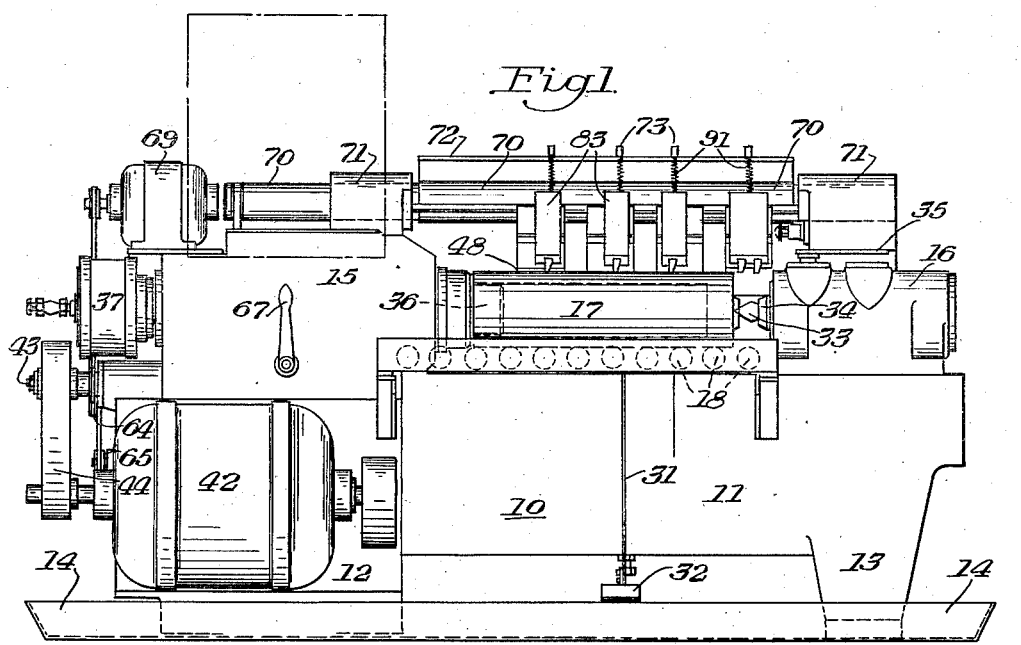
Fig. 1 is a front view in elevation of the machine comprising this invention.

Referring principally to Fig. 1 of the drawings, the bed 10 of the machine is a large casting having a cylindrical intermediate portion 11 elevated by spaced supports 12 and 13 and having ways formed along the top surface thereof. The supports rest in the lubricant pan 14 and the support 12 extends above the cylindrical intermediate portion forming the head stock support as indicated at 15 and is arranged to house the rotary parts at the left end of the machine. The tail stock housing or support 16 is mounted on the ways of the bed of the machine above the support 13 and is arranged to house the rotary parts at the right end of the machine. Thus the housings 15 and 16 are integral within themselves and may be likened to spaced parallel plates which support the working parts of the lathe therebetween. This structural arrangement is an important feature of this invention which will be developed later in this description.

Figure 3:
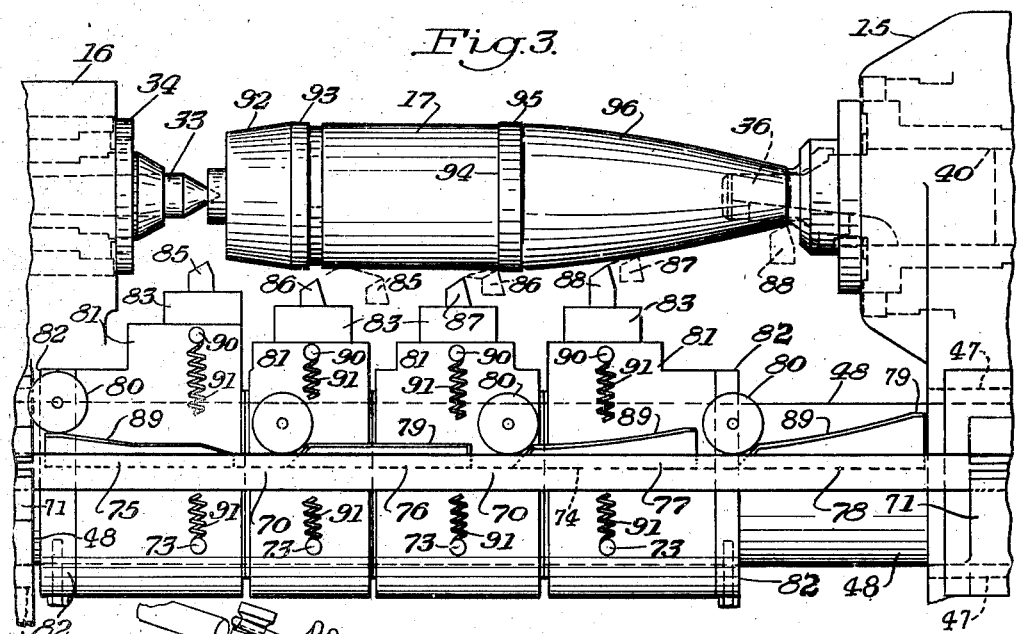
Fig. 3 is a plan view of a portion of the machine showing the shell case chucked therein and the tool carriage on which a plurality of cutting tools are pivotally supported, the movement of each tool being controlled by an independent cam.

The shell case 17 is hollow and has a solid head at one end and a mouth and throat at the other end. When the shell cases are brought to this machine they are usually cylindrical in shape as indicated in Fig. 1 and when turned may appear as shown in Fig. 3. Shell cases of varying size and shape may be turned on this machine as it is provided with a large swing and the tail stock housing 16 may be adjustably positioned along the ways to accommodate different shell case lengths and the cutting tools may be set accordingly. It will be noted that the mouth of the shell case shown in Fig. 1 is larger than that shown in Fig. 3. These different sizes and shapes of shell cases are shown to illustrate the flexibility of this lathe.

Figures 2, 6, 7, 8:
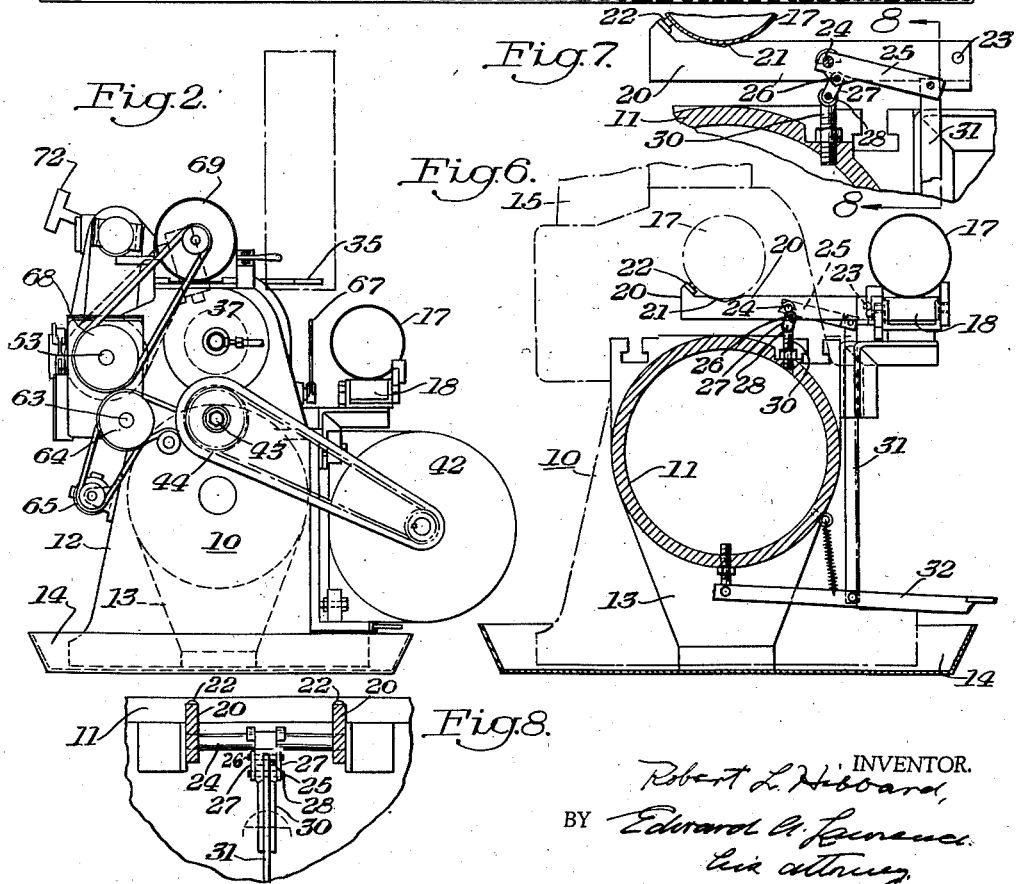
Fig. 2 is an end view of the machine showing the drive therefor.
Fig. 6 is a sectional view of the machine showing the conveyor and elevator by which the shell cases are inserted and withdrawn from the machine.
Fig. 7 is an enlarged sectional view of the shell case elevator with parts broken away.
Fig. 8 is a view taken on the line 8—8 of Fig. 7.

The shell cases 17 are generally transported to the machine on the roller conveyers 18 extending along in front of the lathe and supported by the intermediate portion 11 of the bed as shown in Figs. 1, 2 and 6. The shell case is rolled off the conveyer onto the parallel elevating arms 20 which form a track extending transversely above the intermediate portion 11 of the bed. The elevating arms are provided with aligned notches 21 and stops 22 in which the shell case is cradled. These arms are secured together and pivoted on the shaft 23 journaled in brackets secured to the bed portion 11. A rod 24 connects the arms 20 intermediate of their length. A lever 25 is pivotally connected to the rod 24 as shown in Figs. 6, 7 and 8. A transverse pin 26 is secured to the underside of the lever 25 and slightly in front of the rod 24. The pin 26 is in turn connected by the links 27 to the transverse pin 28 that is secured to the top of the post 30 adjustably secured to the intermediate portion 11 of the bed. Thus by raising and lowering the post 30 the elevator arms 20 may be adjusted to accommodate various sizes of shell cases. The outer end of the lever 25 is pivotally secured to the connecting link 31 which in turn is pivotally connected at its lower end to the intermediate portion of the foot treadle 32. By depressing the foot treadle 32 the lever 25 is swung downwardly causing the pin 26 to throw the links 27 toward the rod 23 and thus straighten the links, thereby raising the elevator arms 20 to lift the shell case 17 approximately one-eighth of an inch into position where it may be chucked in the lathe. Heavy shell cases may be readily lifted by this toggle arrangement.

The head of the shell case 17 is provided with a center hold arranged to be engaged by the live tail stock 33 whih is rotatably supported on antifriction bearings carried by the piston 34 that is moved axially by fluid under pressure, controlled by the valve leader 35.

When the shell case 17 is elevated in alignment with the tail stock, the valve lever 35 is turned to energize the piston 34 and move it to the left, causing the tail stock to engage the center hole in the head of the shell case. The lever 35 also controls the movement of the expanding chuck 36 to the right and when the shoulder on the chuck strikes the mouth end of the shell case the expanding grips are moved into engagement with the throat. The shell case is then properly chucked in the lathe. The expanding chuck 36 is actuated by the piston in the chamber 37 at the left of the housing 15 which when energized by fluid under pressure advances the rod 38 extending through the spindle 40 shown in Fig. 3 to move the chuck out of its housing into the throat of the shell case. When the shoulder of the chuck engages the end of the shell case, further advancement of the rod 38 expands the jaws of the clutch 36 to tightly force the gripping fingers against the throat of the shell case. This structure is shown in Fig. 5. Thus the shell case 17 is chucked in the lathe ready to be turned.

The spindle 40 is rotatably mounted on the spaced antifriction bearings 41 supported by the housing 15 and is driven by the large motor 42 mounted on the face of the stand 12. The motor 42 drives the shaft 43 through the belt connection 44 on one end thereof. The other end of the shaft 43 has the pinion 45 formed thereon which engages the gear 46 secured to the spindle 40. In this manner the shell case 17 is driven by the spindle 40 through the expanding chuck 36.

Figure 4:
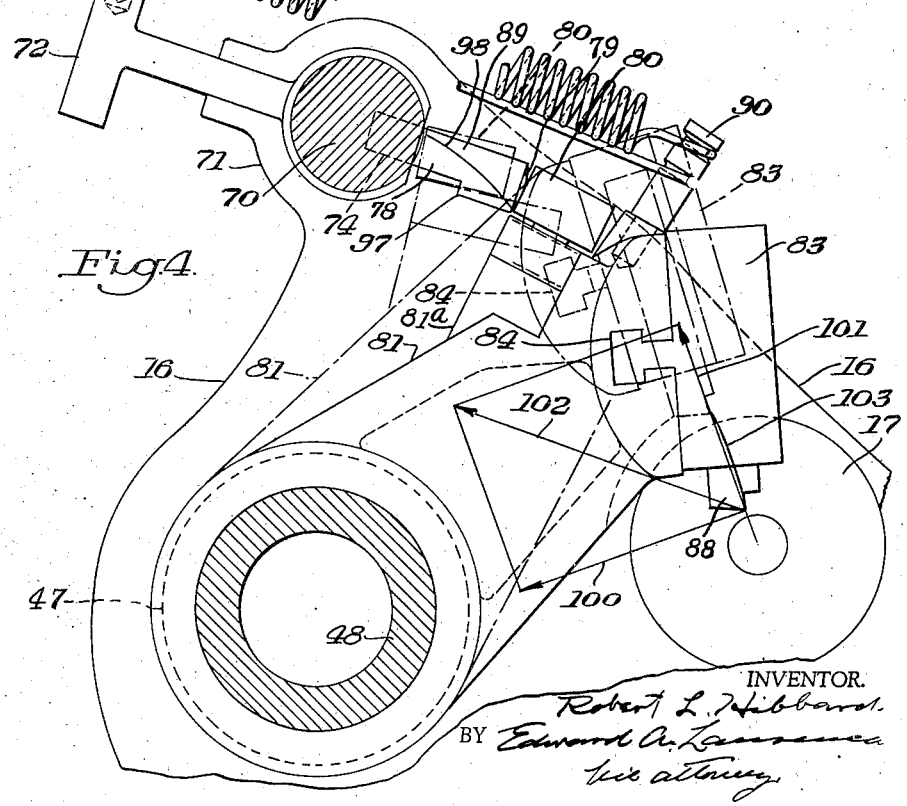
Fig. 4 is an enlarged sectional view of the tool carriage, the cam bar and the work piece.

The housing 15 and the tail stock housing 16 are provided with aligned bearings 47 one of which is shown in Fig. 5 and the other is contained in the housing 16 shown in Figs. 3 and 4, for slidably carrying the large tubular carriage on tool holder bar 48. As shown in Fig. 5 one end of the tubular carriage is provided with an enlarged bore for receiving the nut 50 which is provided with a flange 51 that lies over the end of the carriage and is secured thereto by the bolts 52. One end of the threaded shaft 53 is arranged to turn within the nut 50 and the other end is carried by the axialy aligned bearing 54. A worm gear 55 is journaled on the shaft 53 on the opposite side of the bearing 54 from the thread. The worm gear meshes with the worm pinion 56 on the transversely disposed intermediate shaft 57 which also carries the small spur gear 58 that meshes with the spur gear 59 on the parallel shaft 60 positioned directly therebelow. The other end of the shaft 60 carries the beveled gear 61 which meshes with the beveled gear 62 on the shaft 63 that extends through the housing and is provided with a V-belt pulley 64 at its outer end that is driven by the motor 65 as shown in Fig. 2. This gear reduction drive may be connected to the threaded shaft 53 by shifting the clutch member 66 mounted thereon into engagement with the clutch counterparts on the worm gear 55. The clutch member is actuated by the lever 67 in front of the housing 15. When the threaded shaft 53 is rotated slowly in a clockwise direction in Fig. 2 the carriage is slowly drawn to the left in Fig. 1.

The outer end of the threaded shaft 53 has the sprocket 68 secured thereto which is driven by the motor 69 mounted on top of the housing 15 for rapidly traversing the carriage to the right in Fig. 1.

The cam bar 70 is carried by and clamped in aligned sockets 71 in the spaced housings 15 and 16 to prevent it from either rotating or moving longitudinally, as shown in Fig. 1. A post rack 72 is secured to the cam bar for adjustably receiving the spring posts 73 as clearly shown in Fig. 4. From this figure it will be noted that the axial center of the carriage 48 is slightly lower than the axial center of the shell casing 17 covered by the spindle 40 and the tail stock 33, whereas the cam bar 70 is materially above these axes. These three axes form the apices of a triangle which are held in rigid spaced relation at both ends by the integral housing 15 and 16. Thus the active and reactive forces between these three axes are confined within the housing 15 and 16 and are not transmitted to other parts of the machine.

The inner face of the cam bar 70 is provided with the longitudinal slot 74 arranged to receive a series of cams which may be adjustably secured therein at any selected position. These cams are more clearly illustrated in Fig. 3 wherein four are shown and are numbered 75, 76, 77 and 78 respectively from left to right. Each of these cams are engaged by a roller 80 which is rotatably carried on a stub shaft mounted in the adjacent rocker arm 81 pivotally supported on the carriage 48. The four rocker arms 81 are pivotally supported independently from one another and vary in width to properly locate the cutting tools carried thereby relative to specific sections of the axial profile of the shell case to be turned and in accordance with the length of the cut to be taken by each tool. The stub shafts of the rollers 80 on the outer rocker arms 81 are supported on outwardly projecting brackets 81a formed integral with these rocker arms since they are not sufficiently wide to accommodate the rollers and let them engage their respective cams for the full length thereof. The engaging faces between the rocker arms are finished and reduced in area to eliminate any tendency of the rocking movement of one to effect the movement of the next adjacent rocker arms. The group of four rocker arms 81 are prevented from moving axially on the carriage 48 by the collars 82 which are secured to the carriage and retain the rocker arms therebetween. The end face of each rocker arm is provided with a horizontally extending T-slot 84. The tool head 83 is provided with a T-shaped counterpart arranged to slide in the slot and thus permit the tool head to be adjustably positioned longitudinally of the carriage. Each tool head 83 is arranged to carry its respective cutting tool which may be adjusted vertically therein. The tool heads may be clamped to their respective rocker arms and the tools clamped to their respective tool heads by any suitable means such as set screws which are not shown. Thus the location of the cutting point of each tool may be accurately positioned relative to that portion of the shell case it is to cut and the movement of the cutting tool is controlled for the full length of the cut by the cams mounted on the cam bar.

As shown in Fig. 3 the cutting tools are designated at 85, 86, 87 and 88 and the cutting stroke of each of these tools is controlled by their respective cams 75, 76, 77 and 78.

Each rocker arm is provided with an upwardly extending spring post 90 corresponding to the spring post 73 on the post rack 72 mounted on the cam bar 70. Each set of posts 73 and 90 is connected by a coil spring 91 as shown in Fig. 4 which holds the roller 80 of each rocker arm in engagement with the cam surfaces and the cam bar. Thus when the shell case 17 is rotated and the carriage 48 is slowly moved to the right in Fig. 3 the rollers 80 are caused to move their respective rocker arms 81 and cutting tools along the predetermined path fixed by the faces of the stationary cams. The face of the cam 75 thus causes the tool 85 to engage the head of the shell case 17 and cut the taper 92, then the adjacent cylindrical surface 93 in accordance with the shape of this cam. As the roller 80 proceeds down the last slope of the cam 75 onto the cam bar 70, the tool 85 is withdrawn from the work as indicated by the outline of the tool 85 in dotted lines representing the end of the cutting stroke. At the same time the next roller is moved up off the cam bar 70 by the cam 76 and the cutting tool 85 is caused to continue the straight cylindrical surface 93, ending at the shoulder 94 as indicated by the tool 85 in dotted lines. The cutting stroke of the tool 86 first forms the cylindrical surface 95 adjacent the shoulder 94 and then the cam 77 causes the tool to start the tapered surface 96. The cam 78 causes the tool 88 to cut its portion of the tapered surface 96 ending at the mouth of the shell case 17.

The cut of tools 85 and 86 and tools 87 and 88 may overlap, as indicated in Fig. 4, and when these tools are accurately set they produce a smoothly finished shell case accurately turned by one cut to within a few thousandths of an inch.

When the carriage approaches the limit of its movement it strikes a stop that disengages the clutch 66 shown in Fig. 5 which arrests any further movement of the carriage 48 and automatically deenergizes the motors 65 and 42, thereby stopping the rotation of the completely turned shell case. The lever 35 on the tail stock housing 16 is then moved to retract the tail stock piston 34 and the rod 38 in the spindle. Retraction of the rod 38 causes the grips of the chuck to become disengaged from the throat of the shell case and further retraction withdraws the clutch 36 from the mouth of the shell case into its housing. The finished shell case not being supported at either end drops to the elevator arms 20 and is then rolled out of the machine onto the conveyer 18. When the lathe is empty the rapid traverse motor 68 is energized to quickly return the carriage 48 to the other end of the lathe, thus positioning the tools in readiness to turn another shell case. Another shell case is then rolled off the conveyer and chucked in the lathe and the turning operation repeated.

It should be noted in Figs. 3 and 4 that the operating cam surfaces of the cams mounted in the cam slots 74 are arcuate. Thus the sections of the cam surfaces producing a cylindrical cut are cylindrical and the surfaces producing a tapered cut are conical as shown at 79 and 89 respectively. In some instances the cams must have an outwardly projecting flange 97 at the outer end thereof to provide a full contacting arcuate surface for the roller 80 at the highest point on the cams due to the large angle through which the rocker arm travels. However the base of each cam is of uniform width so that they will properly fit in the slot 74 of the cam bar 70.

When the carriage 48 is traversed longitudinally of the lathe and the rocker arms 81 are moved by the cams toward or away from the cam bar, the cylindrical rollers 80 having point contact with the arcuate surfaces of the cams, roll along the path indicated by the line 98 across the conical face 89 of the cam 78 shown in Fig. 4. If the cam surface is cylindrical as indicated at 79 in Fig. 3 the rocker arms do not move relative to the carriage as it travels from one end of the lathe to the other and the cam roller moves in lineal contact along a straight path. If the cam surface slopes or is conical as indicated at 89 the rocker arm moves relative to the carriage and the cam roller contacting path 98 extends from one side of the cam surface to the other across the face of the cam as illustrated in Fig. 4.

As shown in full lines in Fig. 4 the cutting tool is located at its innermost position and the cam roller is at the top of the cam. In turning the work this tool 88 produces two forces, one tangent to the surface of the work piece being turned as represented by the vector 100 and the other at 90° thereto as represented by the vector 101. The resultant cutting force is represented by the vector 102 which is the summation of the vectors 100 and 101. The cam bar 70 and the carriage 48 are supported in the housings 15 and 16 so that the resultant force as represented by the vector 102 is directed between the axes of the cam bar and the carriage, thereby dividing the cutting load between these two members. The slight arcuate path 103 of the cutting tool in traveling from the large to the small diameter of the shell case is substantially along the vector 101 and assuming that the cutting forces are the same throughout the cut, this vector diagram will be raised or lowered, depending upon the direction of movement of the rocker arm in following the respective cam surface.

As described above, the surface of the cam 75 works the tool 85 outwardly and then parallel. The cam 76 works the tool 86 parallel. The cam 77 works the tool 87 parallel for a short distance and then inwardly and the cam 78 works the tool 88 inwardly. The resultant force of the tool 86 stays in the same position while the resultant forces of the three tools 85, 87 and 88 are changing in position throughout the turning operation but the movement of the resultant forces of the tools 85 and 87 produce an average that is substantially fixed. However the total turning load of the four cutting tools may shift somewhat between the axes of the cam bar 70 and the carriage 48 but it is approximately midway between these two axes. These axes may be located so that the total turning load may be divided in favor of the cam bar 70 by directing the total resultant load somewhat closer to the cam bar because it is stationary and the smaller part of the load may be taken by the carriage 48 which has to move longitudinally in spaced bearings in the housings 15 and 16. Such a division in the total resultant load may be sixty to forty percent. However judging by the shape of the cams the total resultant load of the structure shown is substantially equally divided between the cam bar and the carriage.

By constructing the lathe so that the three working axes, the cam bar, the carriage and the shell case, are supported in spaced parallel plates represented by the housing 15 and 16, the turning forces are confined within the plates and are not transmitted to other parts of the machine. By dividing the cutting load substantially equal between the cam bar 70 and the carriage 48 the tools will cut smoothly without chattering, which was found not to be true when the cam bar is placed below the carriage, thus converting the rocker arms into simple levers.

Only one stroke of the carriage is required to turn the shell case and with this triangular arrangement of the three axes, the cam bar, the carriage and the work, a shell case may receive a finished cut to within two thousandths of an inch. Different sizes of machines are employed for turning different sizes of shell cases and ordinarily three machines are employed, one to cut off the nose at one end and face the head at the other end, another to produce a cylindrical body as shown in Fig. 1 and a third to produce the axial profile in the finished cut as shown in Fig. 4. The use of a plurality of cutting tools each independently controlled by a cam materially increases the production rate in turning these shell cases. In turning the cylindrical shell case for the rough cut as shown in Fig. 1 the rocker arms 81 may be held in spaced relation on the carriage by spacing blocks and more than one tool may be mounted in the tool heads 83 to initially prepare the tapering portions of the shell case.

I claim:

1. A lathe for turning work pieces of circular cross section which comprises a pair of opposed housings, an axially aligned chuck and tail stock rotatably supported in the housings for carrying the work piece therebetween, means for rotating the chuck to revolve the work piece, a carriage having its ends journaled in the housings and arranged to be moved parallel with the axis of the work piece, a plurality of rocker arms pivotally supported on the carriage to move independently in planes normal to the axis of the work piece, cutting tools mounted on the rocker arms, a cam bar having its ends secured against movement in the housings, cams adjustably fastened to the cam bar, a cam engaging roller on each rocker arm, spring means for retaining the cam rollers in engagement with their respective cam surfaces, and means for moving the carriage longitudinally to cause the cam rollers to vary the positions of their respective cutting tools and simultaneously turn the surface of the work piece.

2. A tool support, in a lathe provided with a pair of opposed housings, comprising a carriage slidably mounted in the housings, a plurality of rocker arms pivotally supported for independent arcuate movement on the carriage, means for adjustably positioning the rocker arms relative to each other on the carriage, and means carried by the rocker arms for the attachment of tools thereto.

3. The structure of claim 2 in which the means for adjustably positioning the rocker arms includes spacing rings selectively interposed between the rocker arms to regulate the spaced relation of the tools.

4. In a lathe for turning a work piece of circular cross section, the combination with a bed carrying spaced head and tail stock supports having a rotary driven chuck and a tail stock respectively for suspending a work piece for rotation, of opposed bearings in said supports the aligned axes of which are positioned to the rear of the axis of the work piece, a carriage journaled in said bearings and arranged for longitudinal movement, a plurality of rocker arms pivotally supported for independent arcuate movement on but held against longitudinal movement relative to the carriage, tools carried by the rocker arms for operating on the work piece, opposed clamps in the supports above said bearings, a cam bar fixed rigidly in the clamps, a cam surface on the cam bar for engaging each rocker arm, the disposition of the carriage and the cam bar relative to the work piece being such to fully expose the latter at the front of the lathe to provide unobstructed clearance for the introduction and removal of the work piece, and means for moving the carriage longitudinally to engage the rocker arms with their respective cam surfaces and simultaneously move the tools into operating relation with the work piece.

5. In a lathe for turning a work piece of circular cross section, the combination with a bed carrying spaced head and tail stock supports having a rotary driven chuck and a tail stock respectively for suspending a work piece for rotation, of opposed bearings in said supports the aligned axes of which are positioned to the rear of the axis of the work piece, a carriage journaled in said bearings and arranged for longitudinal movement, a plurality of rocker arms pivotally supported for independent arcuate movement on but held against longitudinal movement relative to the carriage, tools carried by the rocker arms for operating on the work piece, opposed clamps in the supports above said bearings, a cam bar fixed rigidly in the clamps, a cam surface on the cam bar for engaging each rocker arm, the disposition of the carriage and the cam bar relative to the work piece being such to fully expose the latter at the front of the lathe to provide unobstructed clearance for the introduction and removal of the work piece, a nut fixed to the carriage, a threaded shaft engaging in the nut and held against longitudinal movement, and means for rotating the shaft to move the carriage longitudinally and engage the rocker arms with their respective cam surfaces and simultaneously move the tools into operating relation with the work piece.

6. In a lathe for turning a work piece of circular cross section, the combination with a bed carrying spaced head and tail stock supports having a rotary driven chuck and a tail stock respectively for suspending a work piece for rotation, of a carriage mounted on the supports independently of the bed and arranged to move longitudinally in a path to the rear of the axis of the work piece, a cam bar rigidly clamped adjacent its ends in the supports above the carriage, a plurality of rocker arms pivotally supported for independent arcuate movement on but held against longitudinal movement relative to the carriage, tools carried by the rocker arms for operating on the work piece, a cam surface on the cam bar for engaging each rocker arm to control the extent of arcuate movement of the tool, the cutting profile of the tool being disposed relative to the carriage and the cam bar to divide the cutting load therebetween, and means for moving the carriage longitudinally to engage the rocker arms with their respective cam surfaces and simultaneously move the tools into operating relation with the work piece.

7. The structure of claim 6 characterized in that the relative positions of the tool, the carriage and the cam bar are arranged to equally divide the load between the two latter members.

8. In a lathe the combination of a bed, a head stock housing carried by the bed, a tail stock housing arranged to be secured to the bed in different positions relative to the head stock housing to accommodate work pieces of different lengths, a rotary driven chuck and a tail stock mounted in alignment in the head and tail stock housings respectively for supporting the work piece therebetween, a carriage supported in aligned bearings in said housings and arranged to be moved longitudinally, a tool supported by the carriage and arranged to machine the work piece, and a bar having its ends secured in said housings above the position of the work piece and the carriage for rigidly holding the upper end of the tail stock housing.

9. The structure of claim 8 which also includes means carried by said bar to cooperate with the tool in machining the work piece.

ROBERT L. HIBBARD.

REFERENCES CITED

The following references are of record in the file of this patent:

UNITED STATES PATENTS

| Number | Name | Date |
|---|---|---|
| 2,239,413 | Dewey | Apr. 22, 1941 |
| 1,861,113 | Coberly | May 31, 1932 |
| 2,061,311 | Lovely | Nov. 17, 1936 |
| 2,080,830 | Mobius | May 18, 1937 |
| 2,249,148 | Lovely et al. | July 15, 1941 |
| 2,317,522 | Curtis | Apr. 27, 1943 |
| 1,862,516 | Powell | June 7, 1932 |
| 1,239,422 | Michel-Levy | Sept. 4, 1917 |
| 1,265,785 | Isnard | May 14, 1918 |
| 1,506,737 | Drissner | Sept. 2, 1924 |
| 1,655,655 | Melling | Jan. 10, 1928 |